(12) United States Patent
Ningrat et al.

(10) Patent No.: US 9,454,272 B2
(45) Date of Patent: Sep. 27, 2016

(54) TOUCH SCREEN FOR STYLUS EMITTING WIRELESS SIGNALS

(71) Applicant: STMicroelectronics Asia Pacific Pte Ltd, Singapore (SG)

(72) Inventors: Kusuma Adi Ningrat, Seoul (KR); Giuseppe Noviello, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 64 days.

(21) Appl. No.: 14/284,650

(22) Filed: May 22, 2014

(65) Prior Publication Data

US 2015/0338950 A1    Nov. 26, 2015

(51) Int. Cl.
*G06F 3/044* (2006.01)
*G06F 3/0354* (2013.01)

(52) U.S. Cl.
CPC ........... *G06F 3/044* (2013.01); *G06F 3/03545* (2013.01)

(58) Field of Classification Search
CPC .............................. G06F 3/044; G06F 3/0545
See application file for complete search history.

(56) References Cited

U.S. PATENT DOCUMENTS

| | | | |
|---|---|---|---|
| 4,563,645 A | 1/1986 | Kerr | |
| 5,359,156 A | 10/1994 | Chan et al. | |
| 5,854,625 A | 12/1998 | Frisch et al. | |
| 5,977,803 A | 11/1999 | Tsugai | |
| 6,002,387 A | 12/1999 | Ronkka et al. | |
| 6,075,520 A | 6/2000 | Inoue et al. | |
| 6,545,612 B1 | 4/2003 | Lindgren et al. | |
| 7,030,860 B1 | 4/2006 | Hsu et al. | |
| 7,454,967 B2 | 11/2008 | Skurnik | |
| 7,812,825 B2 | 10/2010 | Sinclair et al. | |
| 8,294,678 B2 | 10/2012 | Wu | |
| 8,300,024 B2 | 10/2012 | Wu | |
| 8,481,872 B2 | 7/2013 | Zachut | |
| 8,618,819 B2 | 12/2013 | Sawataishi et al. | |
| 2003/0080755 A1 | 5/2003 | Kobayashi | |
| 2003/0142081 A1 | 7/2003 | Iizuka et al. | |
| 2005/0030724 A1 | 2/2005 | Ryhanen et al. | |
| 2005/0094022 A1 | 5/2005 | Wang et al. | |
| 2006/0125801 A1 | 6/2006 | Hsu et al. | |
| 2007/0070050 A1 | 3/2007 | Westerman et al. | |
| 2007/0089527 A1 | 4/2007 | Shank et al. | |
| 2007/0159184 A1 | 7/2007 | Reynolds et al. | |
| 2007/0195009 A1* | 8/2007 | Yamamoto | G06F 1/1652 345/1.1 |

(Continued)

OTHER PUBLICATIONS

Lei, et al., "An Oversampled Capacitance-to-Voltage Converter IC With Application to Time-Domain Characterization of MEMS Resonators", IEEE Sensors Journal, vol. 5, No. 6, Dec. 2005, pp. 1353-1361.

(Continued)

*Primary Examiner* — Latanya Bibbins
(74) *Attorney, Agent, or Firm* — Gardere Wynne Sewell LLP (57) ABSTRACT

A touch screen device is configured with rows of conductors capable of receiving wireless signals from a stylus. When the stylus touches the touch screen, the stylus emits multiple wireless signals in different directions. The conductors receiving the emitted wireless signals provide the signals to circuitry that filters, amplifies, and digitizes the wireless signals, as received at each conductor. The magnitude of each conductor's received wireless signal is computed, and the computed magnitudes are used to determine the location of the stylus on the touch screen surface. The stylus is assumed to be closer to conductors receiving stronger signals than those receiving weaker signals.

18 Claims, 5 Drawing Sheets

(56) References Cited

U.S. PATENT DOCUMENTS

| | | |
|---|---|---|
| 2007/0229470 A1 | 10/2007 | Snyder et al. |
| 2007/0268266 A1 | 11/2007 | XiaoPing |
| 2007/0273660 A1 | 11/2007 | XiaoPing |
| 2008/0007534 A1 | 1/2008 | Peng et al. |
| 2009/0174679 A1 | 7/2009 | Westerman |
| 2009/0231294 A1 | 9/2009 | Wu |
| 2009/0244014 A1 | 10/2009 | Hotelling et al. |
| 2009/0296742 A1 | 12/2009 | Sicurello et al. |
| 2009/0303198 A1* | 12/2009 | Yilmaz ............ H03K 17/9622 345/173 |
| 2009/0322355 A1 | 12/2009 | Day et al. |
| 2009/0322410 A1 | 12/2009 | David et al. |
| 2010/0097077 A1 | 4/2010 | Philipp et al. |
| 2010/0097078 A1 | 4/2010 | Philipp et al. |
| 2010/0149125 A1 | 6/2010 | Klinghult et al. |
| 2010/0149126 A1 | 6/2010 | Futter |
| 2010/0188105 A1 | 7/2010 | Khanna et al. |
| 2010/0289503 A1 | 11/2010 | Reynolds et al. |
| 2010/0292945 A1 | 11/2010 | Reynolds et al. |
| 2010/0315099 A1 | 12/2010 | Ootaka |
| 2011/0074446 A1 | 3/2011 | Chou et al. |
| 2011/0096024 A1 | 4/2011 | Kwak |
| 2011/0115503 A1 | 5/2011 | Chou et al. |
| 2011/0133756 A1 | 6/2011 | Reime |
| 2011/0187666 A1 | 8/2011 | Min |
| 2011/0216094 A1* | 9/2011 | Murakami ............ G06F 3/0485 345/660 |
| 2011/0234528 A1 | 9/2011 | Guedon et al. |
| 2011/0242048 A1 | 10/2011 | Guedon et al. |
| 2011/0273400 A1 | 11/2011 | Kwon et al. |
| 2012/0044210 A1 | 2/2012 | Chen et al. |
| 2012/0146668 A1 | 6/2012 | Satake et al. |
| 2012/0200388 A1 | 8/2012 | Miura et al. |
| 2012/0229421 A1 | 9/2012 | Kim et al. |
| 2012/0256645 A1 | 10/2012 | Nguyen et al. |
| 2012/0327041 A1 | 12/2012 | Harley et al. |
| 2012/0331546 A1 | 12/2012 | Falkenburg et al. |
| 2013/0106725 A1 | 5/2013 | Bakken et al. |
| 2013/0154956 A1 | 6/2013 | Tudosoiu |
| 2014/0002108 A1 | 1/2014 | Soo et al. |
| 2014/0015595 A1 | 1/2014 | Van Ausdall et al. |
| 2014/0062922 A1* | 3/2014 | Tang ................. G06F 3/0416 345/173 |
| 2014/0267186 A1* | 9/2014 | Kreek ............... G06F 3/03545 345/179 |

OTHER PUBLICATIONS

U.S. Appl. No. 12/972,159 entitled "Capacitive Sensing Analog Front End", by Yannick Guedon et al, filed Mar. 31, 2010, 51 pgs.

U.S. Appl. No. 12/732,581 entitled "Sample and Hold Capacitance to Digital Converter" by Yannick Guedon, filed Mar. 26, 2010, 20 pgs.

U.S. Appl. No. 12/829,130 entitled "Sensing Phase Sequence to Suppress Single Tone Noise" by Inventor Kusuma Adi Ningrat, filed Jul. 1, 2010, 27 pgs.

* cited by examiner

TOUCH SCREEN FOR STYLUS EMITTING WIRELESS SIGNALS

BACKGROUND

With the proliferation of the Internet, today's mobile devices can display a wealth of interactive Web content. The touch screen provides a particularly efficient user interface for mobile devices because it does not require any peripheral user interface components, like a keyboard, mouse, or track pad. All that is needed to interact with the touch screen's user interface is a finger or a stylus. But as devices shrink in size, the human finger is not always an ideal pointer.

Touch screens may be implemented in a device by overlaying a capacitive touch-sensitive pad over a surface of a display screen. The display screen displays information to a user, and the touch-sensitive pad receives input by detecting the user touching the touch-sensitive pad. Capacitive touch-sensitive pads generally comprise sensors that detect a user's touch by sensing a capacitance between the user's finger and one or more of the touch sensors. The touch (i.e., capacitance) detected by the touch-sensitive pad is received as a user input that is interpreted by the device in accordance with several variables and/or conditions relating to the user's touch. Some of these variables and conditions may include the content displayed on the screen, the status of the device, the location of the touch, the duration of the touch, and combinations thereof.

A human finger is generally much larger than the point of a stylus, and therefore the two create different capacitive effects on a capacitive touch screen. Today's devices commonly allow either a finger or stylus to be used, so they must be able to recognize either's electrical charge displacement. Some users prefer to use a stylus because it is smaller and provides greater precision for interacting with the touch screen. User preferences drive sales of mobile devices, so a device's inability to properly recognize stylus touches can quickly scare away customers.

SUMMARY

This Summary is provided to introduce a selection of concepts in a simplified form that are further described below in the Detailed Description. This Summary is not intended to identify key or essential features of the claimed subject matter, but instead is provided to illustrate different embodiments.

One aspect is directed to a touch screen device that detects the location of a stylus touching a touch screen. The stylus is equipped with a transmitter to emit wireless signals, and the touch screen includes conductors that can receive the wireless signals. An amplifier circuit filters and amplifies the wireless signals, as received by the conductors. An analog-to-digital converter (ADC) digitizes the filtered and amplified wireless signals. A processor determines the magnitude of each of digitized signal using an algorithmic transform. The stylus is assumed to be closer to conductors receiving stronger signals than others, so the location of the stylus on the touch screen can be determined based on the calculated magnitudes of the digital signals.

Another aspect is directed to receiving, at touch screen conductors, wireless signals from a stylus in contact with a touch screen surface. For each of the touch screen conductors, magnitudes of the wireless signals are determined using an algorithmic transform, and the location of the stylus is then determined using the magnitudes of the wireless signals. The location is stored and used to manipulate content being displayed on the touch screen device.

The foregoing and other features and advantages of the present disclosure will become more apparent from the following detailed description of the embodiments read in conjunction with the accompanying drawings. The detailed description and drawings are merely illustrative of some different embodiments, rather than limiting the scope of the invention as defined by the appended claims and equivalents thereof.

DETAILED DESCRIPTION

The present disclosure provides a touch screen device with wireless signal conductors and a circuit capable of locating touches of a stylus on a touch screen device. The stylus broadcasts wireless signals upon touching the touch screen device, and the location of a touch is determined using a relative-strength algorithm that compares the magnitude of the wireless signals received at a pattern of receiving, antennae-like conductors. To execute the relative-strength algorithm, some embodiments first digitize and then amplify received wireless signals from the stylus, and thereafter execute the relative-strength algorithm on the amplified digitized, amplified signals.

Generally speaking, capacitive touch screens are generally well known in the art and have been widely adopted in various types of electronic devices. Tablet computing devices (e.g., the iPad® from Apple Inc. of Cupertino, Calif.), smartphones (e.g., the iPhone® from Apple Inc. of Cupertino, Calif.), and global positioning devices (e.g., the Nuvi® from Garmin Corporation), as well as various other devices, all use touch-screen display panels. The styli and touch screens described herein may be incorporated in such devices.

Some embodiments may be described in the general context of computer code or machine usable instructions, including computer-executable instructions such as one or more program modules or objects executable by a processor of a touch screen device. Generally, program modules and objects may include source code, dynamic link libraries (DLLs), data structures, and the like, and refer to code that performs particular tasks or implement abstract data types. Such components are embodied in memory or other computer-readable medium of a computer device. As referenced herein, computer-readable media do not include propagating or other transitory signaling.

Figure 1A:
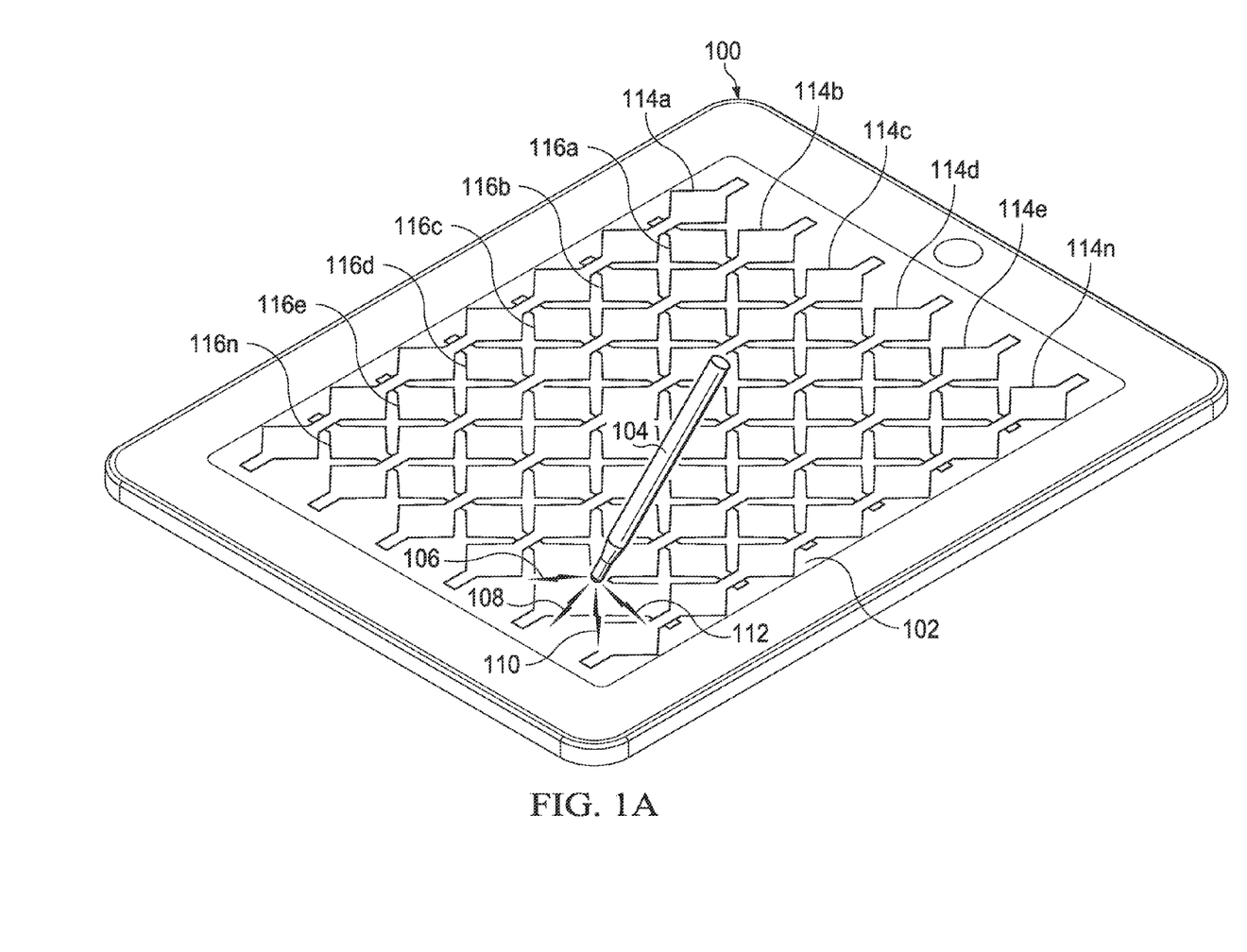
FIG. 1A illustrates a touch screen device that allows users to interact with content displayed on a touch screen using a stylus that emits multiple wireless signals when touched to the touch screen.

Having briefly described an overview of embodiments of the present invention, attention is directed to the accompanying figures. FIG. 1A illustrates a touch screen device 100 that allows users to interact with displayed content using a stylus 104 that broadcasts multiple wireless signals 106-112 when touched to a touch screen 102. The touch screen device 100 includes conductors 114a-n and 116a-n that operate as receivers (i.e., antennae) and are outlaid in a crisscross pattern—other embodiments may have alternative conductor patterns—to detect touches in two dimensions (i.e., x and y). Conductors 114a-n and 116a-n may take the form of capacitive sensors in some embodiments and wireless signal antennae (or receivers) in other embodiments. When stylus 104 touches the touch screen 102, stylus 104 broadcasts a wireless signals 106-112 that can be detected by conductors 114a-n and 116a-n. Internal circuitry of the touch screen device 100 amplifies and digitizes the received wireless signals 106-112 detected by conductors 114a-n and 116a-n. The digitized, amplified signals are processed to determine the magnitude (or strength) of the wireless signal 106-112 received by each conductor 114 and 116, and the location of the touching stylus 104 can be determined based on these magnitudes of the received wireless signals 106-112 at each of the conductors 114 and 116.

An internal processor of the touch screen device 100 calculates the location of the touching stylus 104 on the touch screen 102 based on the magnitude of the wireless signals 106-112 detected by the conductors 114a-n and 116a-n. Wireless signals 106-112 dissipate over distance, so conductors 114a-n and 116a-n receiving stronger wireless signals 106-112 can be assumed to be closer to the stylus 104 touch than those with relatively weaker signal strengths. One embodiment performs relative strength calculations for each conductor 114a-n and 116a-n receiving wireless signals 106-112 to pinpoint where the location of the touching stylus 104. The relative strength calculations are described in more detail below.

Stylus 104 broadcasts wireless signals 106-112 at one or more frequencies. Some embodiments also encode information in wireless signals 106-112 using different frequencies. Such encoded information may indicate different information about the stylus 104, such as a stylus identifier, touch pressure (as measured by a pressure sensor in the tip of the stylus 104), incline of the stylus 104 (as measured by an internal gyroscope in the stylus 104), or the like. One particular embodiment indicates the encoded data by varying the frequencies of the wireless signals 106-112.

Noise may occur on certain frequencies on which the stylus 104 is emitting wireless signals 106-112. To minimize noise, the stylus 104 is configured, in some embodiments, to broadcast multiple (e.g., three) sets of wireless signals 106-112 on different frequencies. For example, a first set may be transmitted at 100 kHz, 120 kHz, 140 kHz, and 160 kHz; a second set may be transmitted at 200 kHz, 220 kHz, 240 kHz, and 260 kHz; and a third set may be transmitted at 300 kHz, 320 kHz, 340 kHz, and 360 kHz. Touch screen device 100 can then process each set to reveal which conductors 114a-n and 116a-n the stylus 104 is touching and compare the determined-to-be-touching conductors 114a-n and 116a-n for each set to each other to uncover a consensus group of conductors. For example, if conductors 114c and 116b are indicated by two sets of wireless signals 106-112 but not a third, software on the touch screen device 100 determines these two conductors to be the touch points while discarding the third set, which can be assumed to be influenced by some kind of noise.

Embodiments may include conductors 114a-n and 116a-n operating in one of two different configurations. One configuration is used to only detect wireless signals from stylus 104. In this configuration, both x and y directions of conductors 114a-n and 116a-n function solely as receivers for wireless signals, and are thus only capable of detecting stylus 104 that emit wireless signals—because fingers do not emit wireless signals.

In a second configuration, the touch screen 102 rapidly switches the functionality of the conductors 114a-n and/or 116a-n for short timeframes between applying voltages for capacitive-touch sensing and receiving wireless signals 106-112. In one embodiment using this configuration, conductors 114a-n and/or 116a-n may emit capacitive-touch voltages for detecting a finger during one timeframe (e.g., 7 ns), then switch to receiving wireless signals 106-112 during a second timeframe (3 ns), and continually repeat this cycle to be able to detect both a finger and stylus 104. In an alternative embodiment, conductors 116a-n in one direction always act as receivers for wireless signals 106-112, and conductors 114a-n in the other direction constantly switch between emitting voltages for capacitive-touch sensing and receiving wireless signals 106-112.

Figure 1B:
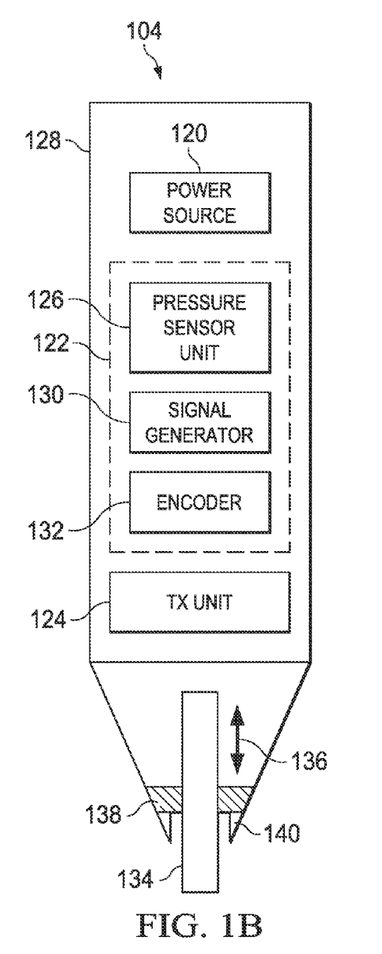
FIG. 1B illustrates a block diagram of an exemplary signal broadcasting stylus.

FIG. 1B illustrates a block diagram of an exemplary signal broadcasting stylus 104 capable of transmitting wireless signals 106-112. Stylus 104 is an asynchronous device comprising a power source 120, controller 122, and a transmitter (Tx) unit 124. The controller 122 may be implemented as an application-specific integrated circuit (ASIC) that includes a pressure sensor unit 126, a signal generator 130, and an encoder 132. Other embodiments may alternatively use a microcontroller configured to interface with such hardware components.

Stylus 104 is powered by power source 120, which, in one embodiment, includes one or more batteries. Signal generator 130 generates wireless signals 106-112, which include either pulsed or steady alternating current (AC) signals. Additionally or alternatively, the wireless signals 106-112 may be generated at different frequencies, such as in the range of 10-50 kHz. The frequency (or frequencies) of wireless signals 106-112 may be different or the same as the voltage frequencies typically used by the touch screen 102 to detect finger touches.

The stylus 104 may emit wireless signals 106-112 at the same or different frequencies than the voltages used by touch screen 102 for capacitive touch detection. Sylus 104 may also encode a signal or other data in the wireless signals 106-112 that is orthogonal to voltage frequencies, or signals therein, used by touch screen 102 for capacitive touch detection.

In one embodiment, stylus 104 includes a pressure sensitive tip 134 that conveys information regarding contact pressure applied to tip 134. In one embodiment, tip 134 recedes into housing 140 in axial direction 136 in response to applied contact pressure by a user operating the stylus (e.g. pressing tip 134 on a surface). Tip 134 is subsequently released when the contact pressure is released (e.g. a hovering state or non-operational state of the stylus 104). During axial movement, tip 134 may be engaged with a resilient element 138, e.g., a spring, whose properties are selected to obtain a desired relationship between contact pressure and axial displacement. Alternatively, tip 134 may be stationary and include one or more other types of pressure, voltage, and current switches or sensors to detect when the tip 134 is touching an object.

Pressure sensor unit 126 senses tip 134 touching an object like touch screen 102, and, in response, directs the signal generator 130 to generate wireless signals 106-112. Encoder 132 is a digital encoder operable to encode operational or identification information in wireless signals 106-112, including the aforementioned encoded information. Encoder 132 may encode such information into wireless signals 106-112 through the selection of different signal frequencies. For example, wireless signals 106-112 may be transmitted at one particular frequency to indicate a first range of inclination (e.g., 15-30 degrees) of the stylus 104 relative to the touch screen 102 and another frequency to indicate a second range of inclination (e.g., 40-60 degrees). Moreover, encoder 132 may use different encoding techniques to properly encode any of the aforementioned encoded information in wireless signals 106-112, such as, for example but without limitation, Amplitude Shift Keying (ASK), Phase Shift Keying (PSK) and Frequency Shift Keying (FSK). In one embodiment, the encode information in wireless signals 106-112 is transmitted over several transmission cycles (e.g., one bit of encoded information is transmitted per transmission cycle).

Figure 1C:
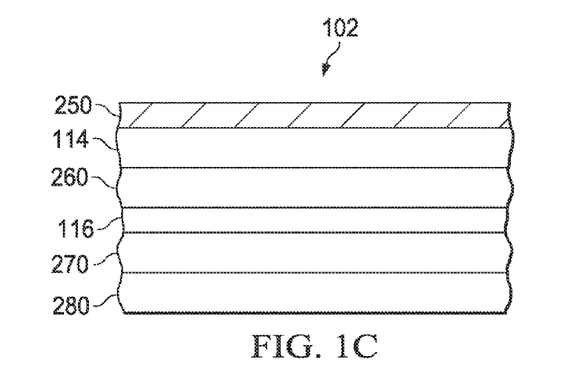
FIG. 1C illustrates a cross-section depiction of a touch screen.

FIG. 1C illustrates a cross-section depiction of touch screen 102. Touch screen 102 comprises a capacitive touch screen panel consisting of multiple layers. Starting at the bottom, a display layer 280 includes a display panel, such as a liquid crystal display (LCD), light emitting diode display, or the like. A supporting substrate layer 270 separates the display layer 280 from a first semiconductor layer through which transparent column traces of indium tin oxide (ITO), antimony tin oxide (ATO) ($SnO_2Sb$), or similar semiconductor material are etched to form conductors 116. A dielectric layer 260 of a dielectric material (e.g., silicon dioxide ($SiO_2$) or silicon nitride ($Si_3N_4$)) separates the first glass layer from a second glass layer through which transparent row traces of ITO, ATO, or other semiconductor material are etched to form conductors 114. An externally exposed transparent cover plate 250 is oriented above the second glass layer.

Figure 2:
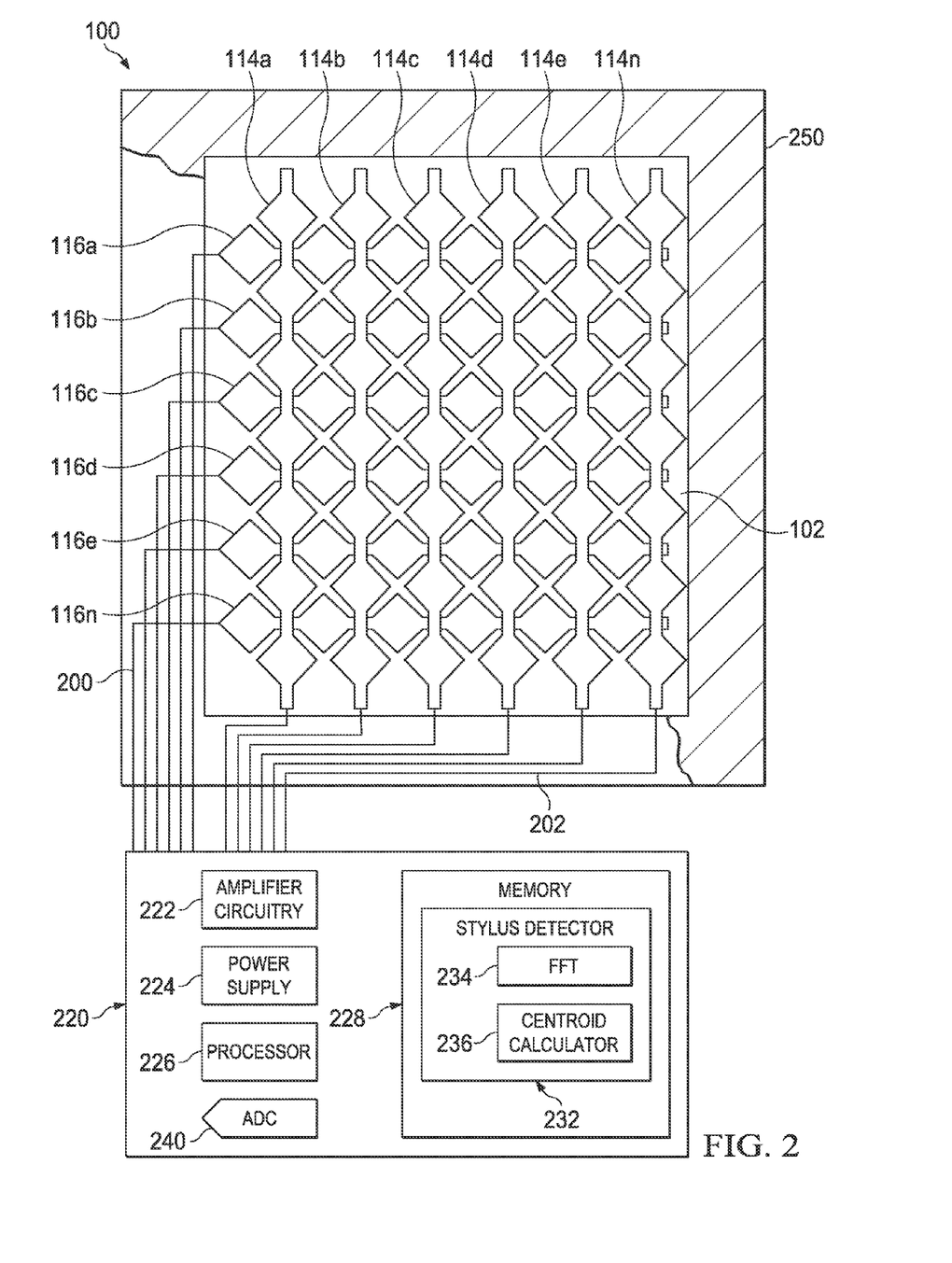
FIG. 2 illustrates a touch screen device with conductors and circuitry for detecting wireless signals emitted by a stylus in contact with a touch screen.

FIG. 2 illustrates an example embodiment of a touch screen device 100 with conductors 114a-n oriented along the y direction and conductors 116a-n oriented along the x direction. Conductors 114a-n and 116a-n are enclosed in the touch screen device 100 and protected with cover plate 250. Conductors 114a-n and 116a-n are capable of receiving wireless signals from stylus 104 through cover plate 250, and in operation, stylus 104 is programmed to emit the wireless signals 106-112 when its tip touches touch screen 102.

In one embodiment, each conductor 114a-n and 116a-n is electrically coupled to one of a set of transmit traces 200 and 202, respectively, that are coupled to control circuitry 220. Through transmit traces 200 and 202, conductors 114a-n and 116a-n pass the received wireless signals to control circuitry 220 for processing. In embodiments where one direction of conductors 114a-n or 116a-n function in a capacitive touch configuration, traces 200 and 202 supply the requisite voltage for application across conductors 114a-n or 116a-n, whichever conductors are configured in a capacitive touch manner.

Control circuitry 220 includes amplifier circuitry 222, a power supply 224, a processor 226, an ADC 240, and computer-readable memory 228, all of which may be operatively connected through one or more bus lines. Although the various blocks of control circuitry 220 are shown with lines for the sake of clarity, in reality, delineating various components is not so clear, and metaphorically, the lines would more accurately be grey and fuzzy. For example, processors 226 have memory themselves. Obviously, additional hardware and software may be included in different touch screen devices 100, but for the sake of clarity, only the illustrated components of control circuitry 220 are discussed herein.

When conductors 114a-n and 116a-n operate as receivers of wireless signals 106-112, received wireless signals 106-112 from stylus 104 are supplied, through traces 200 and 202, to amplifier circuitry 222. Not all conductors 114, 116 will receive the wireless signals 106-112. Only those conductors 114, 116 close enough to the transmitting stylus 104 will receive the wireless signals, and these conductors 114, 116 are referred to as the "receiving conductors." To clarify different embodiments, an example is perpetuated below whereby four conductors 114 and four conductors 116 are receiving conductors. Embodiments are not limited, however, to any particular quantity of receiving conductors 114, 116.

Amplifier circuitry 222, discussed in more detail below, comprises a set of amplifiers that amplify wireless signals 106-112. In one embodiment, each conductor row 114a-n and 116a-n is electrically coupled to its own amplifier. For example, amplifier circuitry 222 may include a first amplifier for conductor 114a, a second amplifier for conductor 114b, and so on for all the 114 conductors. Similar one-to-one pairings of amplifiers can be used for conductors 116a-n. Alternative embodiments may use a one-to-many pairing of amplifiers to conductors 114a-n and 116a-n—e.g., employing a single amplifier for the 114 conductors and a single amplifier for the 116 conductor.

Memory 228 includes a variety of computer-readable media, such as, for example but without limitation, Random Access Memory (RAM); Read Only Memory (ROM); Electronically Erasable Programmable Read Only Memory (EEPROM); flash memory or other computer-storage technologies capable of storing computer-executable instructions. For purposes of this disclosure, "computer-readable memory" and "computer-readable media" do not include any propagating signals or carrier waves. The instructions embodied in memory 228 comprise a stylus detector 232 that includes a fast Fourier transform (FFT) 234 and a centroid calculator 236. Other transforms my alternatively be used, such as a discrete Fourier transform, discrete Hartley transform, or the like.

ADC 240 converts the amplified wireless signals 106-112 received by conductors 114a-n and/or 116a-n to digital representations. Processor 226 executes instructions embodied in memory 228 to determine the location of the stylus 104 on touch screen 102 based on the digital representations of the amplified wireless signals 106-112. For example, wireless signals 106-112 may be received at conductor rows 114b-e and 116b-e when stylus 104 contacts touch screen 102. Each of the four 114b-e conductors and the four 116b-e conductors provide their received wireless signal 106-112 to the amplifier circuitry 222 for amplification: In this example, eight signals—one for each receiving 114 and 116 conductor—are provided to the amplifier circuitry 222 for amplification. ADC 240 digitizes the eight amplified signals, and processor 226 performs a transform stored in FFT 234 on a sampling of the digitized signals to determine magnitudes of sampled digitized signals. The location of the stylus 104 can then be determined based on magnitudes from the FFT 234 of the sampled digitized signals.

Once magnitudes are determined from the FFT 234, the centroid calculator 236 determines where on the touch screen 102 the stylus 104 is touching. Centroid calculator 236, in one embodiment, calculates touch points in the x and y directions based on relative strengths of the magnitudes from the FFT 234 of the digitized, amplified, and sampled wireless signals 106-112. To do this, the magnitudes of the wireless signals 106-112 from receiving conductors 116 in the x direction are summed to calculate the total magnitude (Mag (total)) of the received signals 106-112. For example, if conductor 116b has a magnitude of 100, conductor 116c has a magnitude of 200, conductor 116d has a magnitude of 180, and magnitude 116e has a magnitude of 40, Mag(total) would equal 520. Each receiving conductor 116 is assigned a channel identifier that is multiplied by its magnitude to produce a Channel Strength Value, and all the Channel Strength Values summed to compute the Channel Strength Sum. Continuing with the above example, the four receiving conductors 116b-e may be assigned the following channel identifiers that will produce the following Channel Strength Values:

| Receiving Conductor | Identifier | Magnitude | Channel Strength Values |
| --- | --- | --- | --- |
| Conductor 116b | 1 | 100 | 100 |
| Conductor 116c | 2 | 200 | 400 |
| Conductor 116d | 3 | 180 | 540 |
| Conductor 116e | 4 | 40 | 160 |

The touch point in the x direction is determined by dividing the Channel Strength Sum by Mag(total):

$X$ Touch Point=Channel Strength Sum/Mag(total)

In the above example, Mag(total) equals 520 and the Channel Strength Sum equals 1200, resulting in an X Touch Point of 2.31 (1200/520). The X Touch Point indicates where, relative to the conductors 116 specified by the identifiers, the stylus 104 is determined to have touched in the x direction. In the above scenario, the touch is determined to be between conductor 116c and 116d, slightly closer to conductor 116c (as indicated by the 0.31). The X Touch Point can be determined to be an actual conductor 116 (e.g., 116c) or within a certain proximity to a conductor 116 (e.g., 0.31 the distance from 116c to 116d).

When operating in the pure wireless receiver configuration, centroid calculator performs the same relative strength calculation to determine a Y Touch Point. Processor 226 can then use the X and Y Touch Points to determine the location of the touch of stylus 104.

In embodiments where conductors 114a-n or 116a-n are configured to receive wireless signals and the other direction of conductors 116a-n or 114a-n are configured in a capacitive touch configuration, centroid calculator 236 only determines the largest magnitude digital amplified wireless signal in one direction. Detected changes in capacitance are used to locate the stylus 104 in the other direction.

Additionally, memory 228 may store recognition software that deciphers encoded commands in wireless signals 106-112, such as stylus identifier, pressure, incline, etc. The recognition software may recognize codes based on the different frequencies associated with the signals indicating the significance of bits. For example, wireless signals 106-112 respectively transmitted at frequencies of 100 kHz, 200 kHz, 300 kHz, and 400 kHz may be deciphered by the recognition software in the following manner: 100 kHz (most significant bit), 200 kHz (second least significant bit), 300 kHz (third least significant bit), and 400 kHz (most significant bit).

Figure 3:
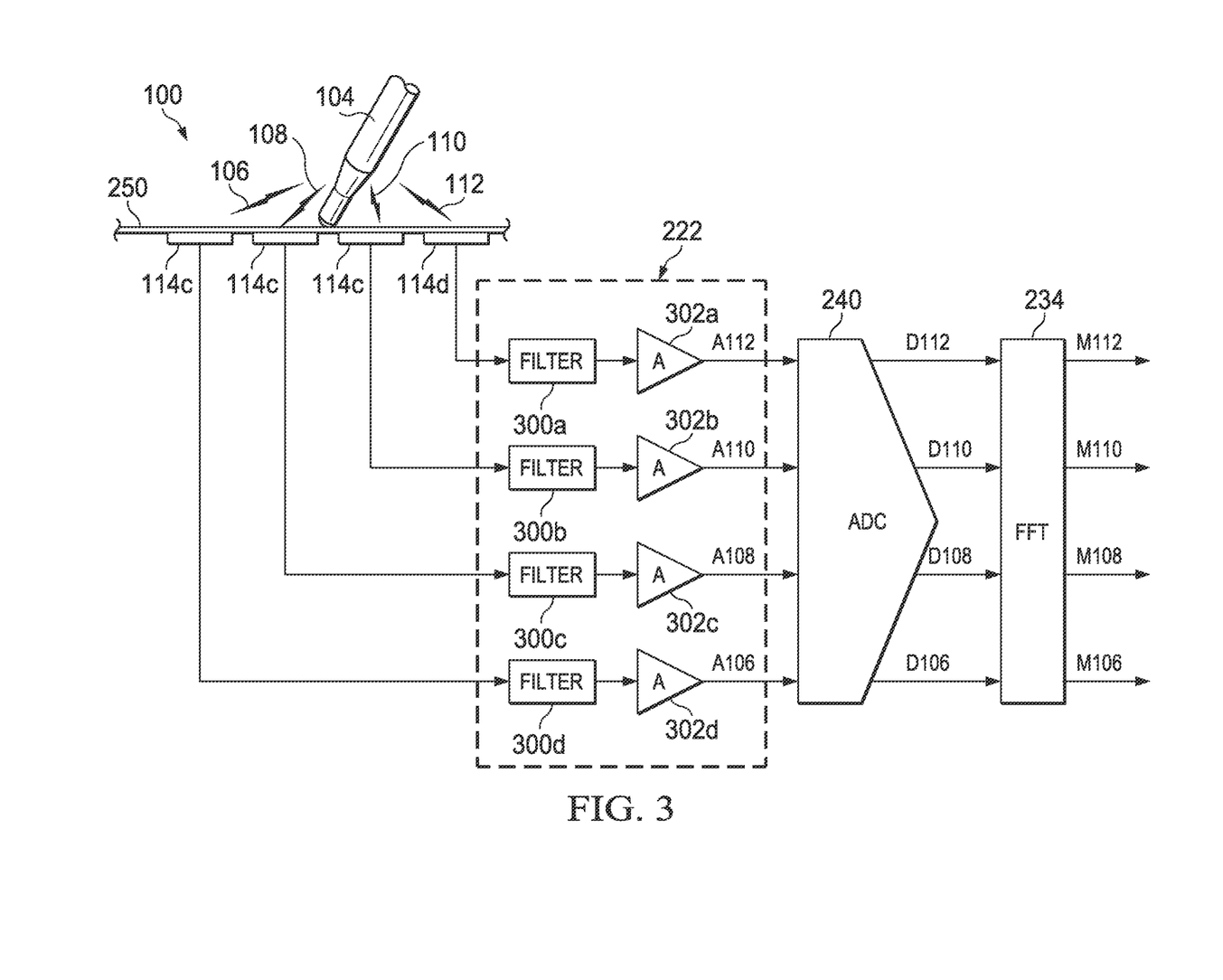
FIG. 3 illustrates a block diagram of conductors on a touch screen device capable of detecting wireless signals from a stylus and circuitry for identifying the location of the stylus based on the wireless signals.

FIG. 3 illustrates a block diagram of conductors 114a-d on a touch screen device 100 capable of detecting wireless signals 106-112 from stylus 104 and circuitry for identifying the location of the stylus 104 based on the wireless signals 106-112. A cover plate 250 encloses conductors 114a-d inside touch screen device 100, and stylus 104 is equipped to generate and emit wireless signals 106-112 upon being touched to the touch screen device 100. Again, wireless signals 106-112 may be transmitted at the same or different frequencies, and may or may not include encoded data about the stylus 104 or its touch (e.g., identifier, pressure, incline, etc.).

Conductors 114a-d receive and provide the wireless signals 106-112 to the amplifier circuitry 222 for amplification. In the shown embodiment, amplifier circuitry 222 comprises filters 300a-d and amplifiers 302a-d for each conductor. Filters 300a-d may include high-pass, low-pass, or band-pass filters that only pass certain portions of the wireless signals 106-112 to amplifiers 302a-d for amplification. While the shown embodiment illustrates each conductor 114 having its own filter 300 and amplifier 302, alternative embodiments may not use filters 300a-d at all, or may use a single filter 300 and amplifier 302 for multiple conductors 114a-d. ADC 240 converts the filtered and amplified versions of wireless signals 114a-d to generate sampled digital representations (D106-112) of wireless signals 106-112. The FFT 234 performs a transform on D106-112 to determine magnitudes M106-112 associated with the wireless signals 114a-d. Magnitudes M106-112 can then be used to determine the closest conductors 114a-d to stylus 104's touch, and thus calculate a Y Touch Point. Such a determination is made, in one embodiment, based on the relative strengths of M106-112, as described above.

Conductors 116 in the x direction may be coupled to similar hardware, and a similar relative-strength calculation can be performed to determine an X Touch Point. The intersecting X and Y Touch Points can then be used to determine the touch of the stylus 104.

Figure 4:
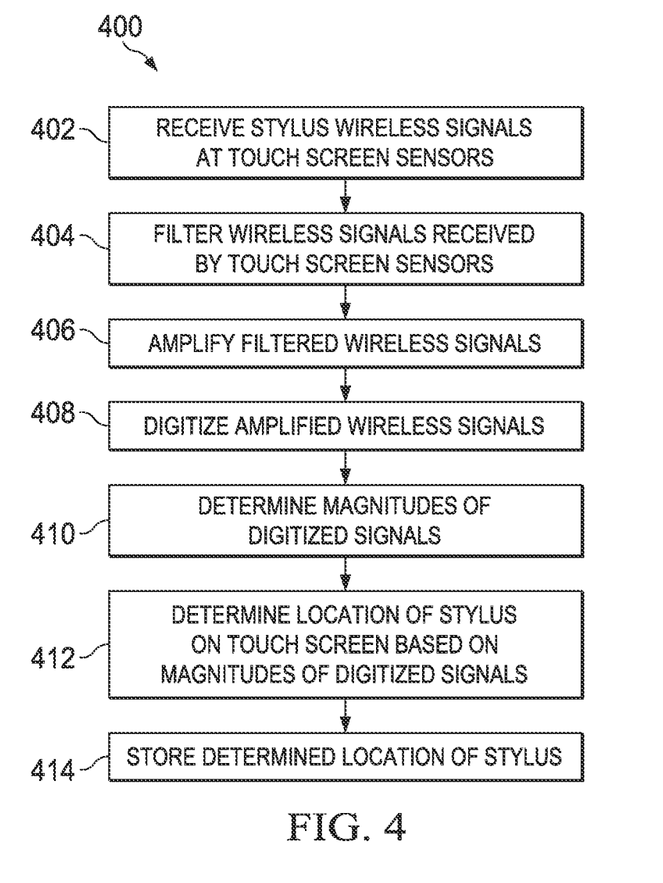
FIG. 4 illustrates a flowchart for detecting a stylus in contact with a touch screen.

FIG. 4 illustrates a flowchart for detecting the location of a stylus 104 brought into contact with a touch screen device 100. The stylus 104 generates and emits multiple wireless signals 106-112 in different directions upon touching a touch screen 102 of the touch screen device 100. Again, these wireless signals 106-112 may include encoded data specific to the stylus 104 (e.g., stylus identifier, touch pressure, inclination, etc.) and may be generated in sets of signals at different frequencies. Touch screen conductors 114a-n and/or 116a-n receive the wireless signals from the stylus 104, as shown at 402. In one embodiment, filters 300 on the touch screen device 100 filter the received wireless signals using a band-pass, high-pass, or low-pass filter, as shown at 404. Amplifying circuitry 222 amplifies the filtered wireless signals, as shown at 406, and an ADC converter 240 digitizes the filtered, amplified wireless signals, as shown at 408. The amplified digital wireless signals are sampled, and an algorithmic transform (e.g., fast Fourier transform, discrete Fourier transform, discrete Hartley transform, or the like) is applied to the sampled signals to determine magnitudes of the wireless signals 106-112, as shown at 410.

The stylus 104's location is determined based on the magnitudes indicating which conductors 114a-n and/or 116a-n received the strongest wireless signals 106-112, as shown at 412. In one embodiment, such a determination is made using a relative-strength calculation. The location may be pinpointed by identifying, in one embodiment, the conductor 116a-n in the x direction receiving the largest magnitude wireless signal and the conductor 114a-n in the y direction receiving the largest magnitude wireless signal. Alternatively, when only one direction of conductors are configured to receive wireless signals 106-112, the perpendicular direction of conductors may use capacitive touch techniques to determine the closest conductor to stylus 104. The location of stylus 104 is stored in memory 228 of the touch screen device 100 and can then be used to manipulate content being displayed.

It should be appreciated that the various embodiments disclosed herein are exemplary. Accordingly, various modifications to these embodiments may be made without departing from the scope of the present disclosure and the claims provided below. The subject matter of the present invention is described with specificity herein to meet statutory requirements. The description itself is not, however, intended to limit the scope of this patent. The claimed subject matter might also be embodied in other ways, to include different steps or combinations of steps similar to the ones described herein, in conjunction with other present or future technologies.

What is claimed is:

1. A touch screen device, comprising:
   a touch screen with a plurality of conductors configured to receive wireless signals from a stylus touching the touch screen, said wireless signals comprising a plurality of signals having different frequencies that digitally encode stylus information;
   a circuit coupled to the plurality of conductors and configured to generate amplified and digitized representations of the received wireless signals; and
   a processor configured to convert the digitized representations of the wireless signals from the time domain to the frequency domain and use magnitudes in the frequency domain to decode the stylus information and determine a location of the stylus on the touch screen.

2. The touch screen device of claim 1, further comprising memory storing instructions that enable the processor to perform an algorithmic transform from the time domain to the frequency domain.

3. The touch screen device of claim 2, wherein the algorithmic transform comprises a fast Fourier transform.

4. The touch screen device of claim 1, wherein the processor determines the location of the stylus by calculating a relative strength value based on the magnitudes in the frequency domain.

5. The touch screen device of claim 1, wherein the processor decodes the stylus information in the wireless signals by setting significance of bits associated with each of the different transmission frequencies of the wireless signals.

6. The touch screen device of claim 5, wherein the stylus information comprises an indication of at least one member of a group comprising a stylus identifier, stylus touch pressure on the touch screen, and stylus inclination relative to the touch screen.

7. The touch screen device of claim 1, wherein the plurality of conductors comprise a first group of conductors spanning one direction of the touch screen and a second group of conductors spanning a perpendicular direction of the touch screen.

8. The touch screen device of claim 7, wherein the first group of conductors are configured to receive the wireless signals, and the second group of conductors are configured to detect changes in capacitance caused by stylus or finger touches of the touch screen.

9. The touch screen device of claim 7, wherein the first and second groups of conductors are configured to receive the wireless signals from the stylus.

10. A touch screen device, comprising:
    a touch screen with a plurality of conductors configured to receive a plurality of wireless signals from a stylus touching the touch screen, said plurality of wireless signals comprising a first plurality of signals having first different frequencies and a second plurality of signals having second different frequencies;
    a circuit coupled to the plurality of conductors and configured to generate amplified and digitized representations of the received first and second pluralities of wireless signals; and
    a processor configured to convert the digitized representations of the received first and second pluralities of wireless signals from the time domain to the frequency domain, determine whether one or more frequency domain signals are corrupted by noise, discard the noise corrupted frequency domain signals and use magnitudes in the frequency domain of non-discarded frequency domain signals to determine a location of the stylus on the touch screen.

11. The touch screen device of claim 10, wherein said plurality of wireless signals further comprises a third plurality of signals having third different frequencies, and wherein said processor operates to identify as the noise corrupted frequency domain signals those frequency domain signals corresponding to one of the first through third pluralities of wireless signals having magnitudes in the frequency domain which differ from the magnitudes of the others of the first through third pluralities of wireless signals.

12. The touch screen device of claim 10, wherein different frequencies in each of the first through third pluralities of wireless signals digitally encode stylus information.

13. The touch screen device of claim 12, wherein the processor is further configured to use the magnitudes in the frequency domain corresponding to the first and second pluralities of wireless signals to decode the stylus information.

14. The touch screen device of claim 13, wherein the processor decodes the stylus information in the wireless signals by setting significance of bits associated with each of the different frequencies in the first and second pluralities of wireless signals.

15. The touch screen device of claim 14, wherein the stylus information comprises an indication of at least one member of a group comprising a stylus identifier, stylus touch pressure on the touch screen, and stylus inclination relative to the touch screen.

16. The touch screen device of claim 10, further comprising memory storing instructions that enable the processor to perform an algorithmic transform from the time domain to the frequency domain.

17. The touch screen device of claim 16, wherein the algorithmic transform comprises a fast Fourier transform.

18. The touch screen device of claim 10, wherein the plurality of conductors comprise a first group of conductors spanning one direction of the touch screen and a second group of conductors spanning a perpendicular direction of the touch screen.

* * * * *